(12) United States Patent
Teng et al.

(10) Patent No.: US 11,441,039 B2
(45) Date of Patent: Sep. 13, 2022

(54) HIGH TEMPERATURE COATINGS TO MITIGATE WELD CRACKING IN RESISTANCE WELDING

(71) Applicant: GM Global Technology Operations LLC, Detroit, MI (US)

(72) Inventors: Zhenke Teng, Troy, MI (US); Jason M. Brown, Goodrich, MI (US); Thomas R. Jones, Macomb Township, MI (US); Pei-chung Wang, Troy, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 17/127,209

(22) Filed: Dec. 18, 2020

(65) Prior Publication Data

US 2022/0195207 A1   Jun. 23, 2022

(51) Int. Cl.
| | | |
|---|---|---|
| *C23C 2/12* | (2006.01) |
| *C09D 5/10* | (2006.01) |
| *C25D 3/44* | (2006.01) |
| *B23K 35/22* | (2006.01) |
| *C23C 2/06* | (2006.01) |
| *C25D 3/22* | (2006.01) |
| *C25D 21/00* | (2006.01) |
| *C25D 21/12* | (2006.01) |

(52) U.S. Cl.
CPC ............ *C09D 5/103* (2013.01); *B23K 35/226* (2013.01); *C09D 5/106* (2013.01); *C23C 2/06* (2013.01); *C23C 2/12* (2013.01); *C25D 3/22* (2013.01); *C25D 3/44* (2013.01); *C25D 21/00* (2013.01); *C25D 21/12* (2013.01)

(58) Field of Classification Search
CPC ................................... C23C 2/06; C23C 2/12
See application file for complete search history.

(56) References Cited

U.S. PATENT DOCUMENTS

| | | | |
|---|---|---|---|
| 2017/0225215 A1* | 8/2017 | Nakagaito | ............... C22C 38/60 |
| 2019/0040487 A1* | 2/2019 | Enloe | .................... C23C 30/005 |
| 2021/0254189 A1* | 8/2021 | An | ........................ C21D 9/0068 |

* cited by examiner

*Primary Examiner* — Hai Y Zhang
(74) *Attorney, Agent, or Firm* — Vivacqua Crane PLLC

(57) ABSTRACT

A high temperature substrate coating to mitigate liquid metal embrittlement (LME) cracking in automobile vehicles includes a substrate. A coating is disposed on the substrate, the coating being one of a zinc-based material and an aluminum-based material, with the coating having a melting point of at least 500° C.

8 Claims, 5 Drawing Sheets

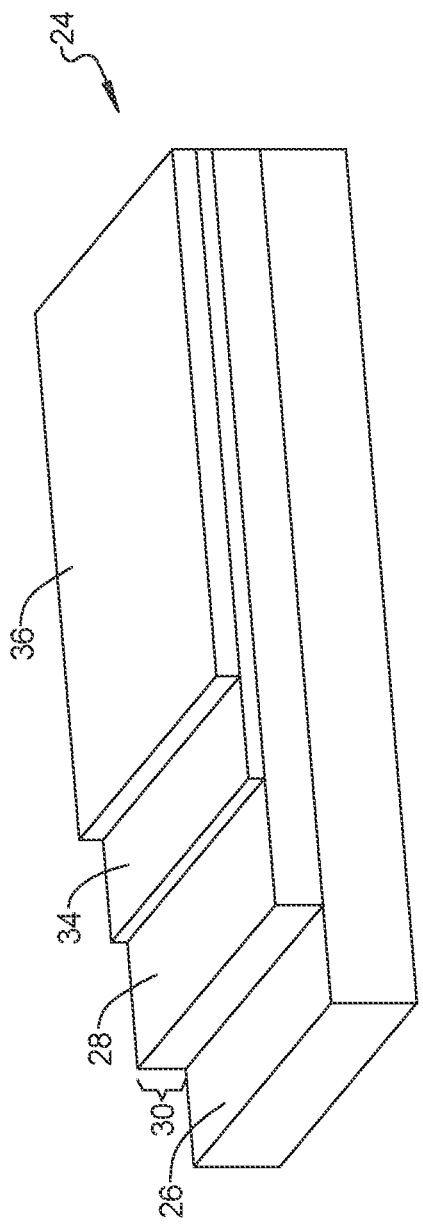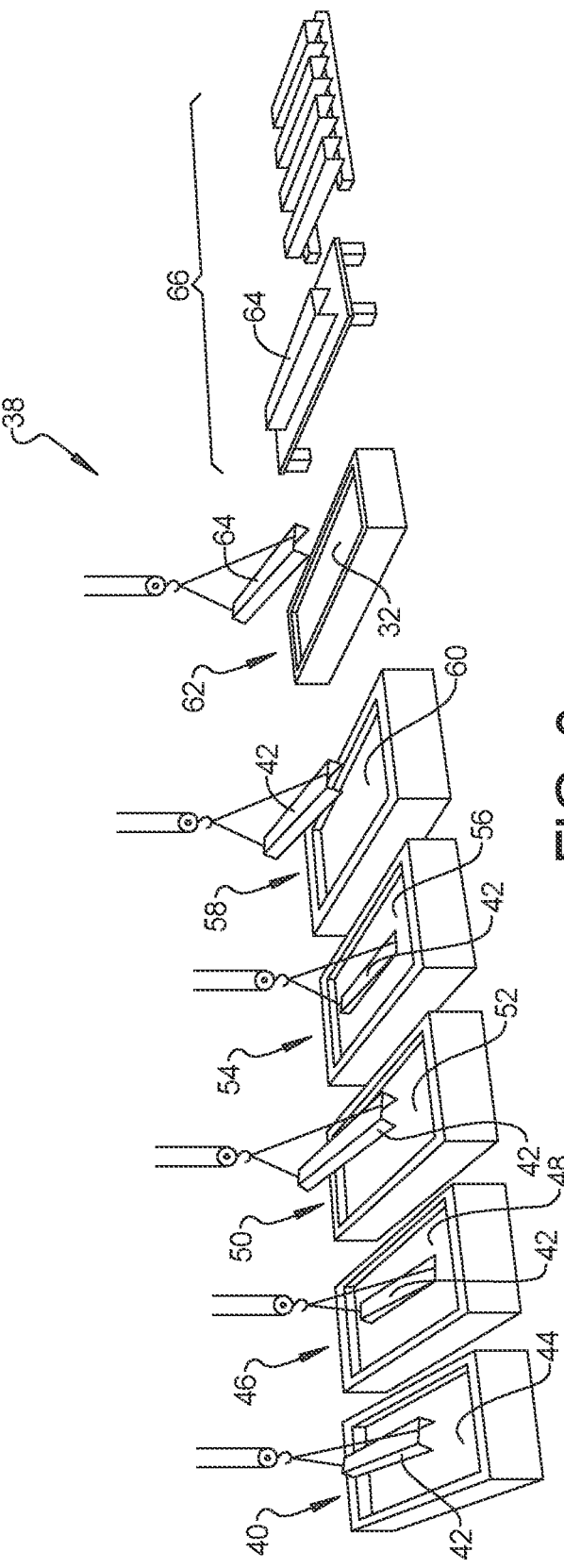

HIGH TEMPERATURE COATINGS TO MITIGATE WELD CRACKING IN RESISTANCE WELDING

INTRODUCTION

The present disclosure relates to coating materials applied to metals which mitigate liquid metal embrittlement cracking during subsequent welding operations.

Metals used in automobile vehicle panels and body structures are commonly coated with a protective coating material such as by an electro-plating process or a hot-dip galvanizing process to mitigate corrosion. Such protective coating materials may include a zinc material and an aluminum material. Melting temperatures of the known and commonly used zinc coating materials are "low", defined herein as melting temperatures at or below approximately 491° C. A tensile stress such as from an internally present tensile stress occurring for example during rapid cooling after coating, or an externally applied tensile stress occurring for example during a welding process may induce liquid metal embrittlement (LME) at the surface of the substrates near a periphery, under the electrodes and/or at an interface between the welded substrates.

LME is known to occur in ductile metals which experience loss of tensile ductility or undergo brittle fracture when exposed to specific liquid metals. A practical significance of LME is evident in multiple steels such as Gen3 steels which are desirable for use in automobile vehicles to achieve increased material strength and reduced weight. Gen3 steels are defined herein as a steel having a minimum tensile strength and elongation product of 20 GPa percent. Gen3 steels have been observed to experience ductility losses and cracking during welding. LME cracking may occur catastrophically and high crack growth rates have been observed. Certain desirable materials such as Gen3 steels which benefit from a corrosion resistant coating have therefore been restricted from use in automobile vehicles.

LME cracking may occur in known zinc and aluminum coating materials during welding operations such as resistance spot welding used to join metal components which have the low melting temperature coating materials. LME cracking may occur due to differences in metal melting temperatures and the pressure applied during the resistance welding process, particularly at an intersection between the base material such as a steel material and the coating material. LME cracking weakens the substrate material, reducing the base strength of the substrate material.

Thus, while current coatings used to mitigate corrosion achieve their intended purpose, there is a need for a new and improved coating material to mitigate cracking during resistance welding.

SUMMARY

According to several aspects, an article includes a substrate. A coating is disposed on the substrate, the coating being one of a zinc-based material and an aluminum-based material, the coating having a melting point of at least 500° C.

In another aspect of the present disclosure, the coating defines a Zn-20Ni material.

In another aspect of the present disclosure, the coating defines a Zn-10Ni-15Fe material.

In another aspect of the present disclosure, the coating defines an Al-10Zn-10Mg material.

In another aspect of the present disclosure, the coating defines an Al-20Si material.

In another aspect of the present disclosure, the coating has a maximum melting point of approximately 1034° C.

In another aspect of the present disclosure, the coating has a thickness ranging from approximately 5 microns up to approximately 50 microns.

In another aspect of the present disclosure, the coating defines one of Zn—Ni and Zn—Ni—Fe to reduce an amount of zinc melting at an electrode contacting coating during a resistance welding procedure.

In another aspect of the present disclosure, the coating defines one of Al—Zn—Mg and Al—Si to reduce an amount of zinc melting at an electrode contacting the coating during a resistance welding procedure.

In another aspect of the present disclosure, the substrate defines a Gen3 steel.

According to several aspects, a coating system having a high temperature coating material to mitigate liquid metal embrittlement (LME) cracking includes a substrate defining a steel material. A corrosion resistant material coating is applied onto the substrate. The corrosion resistant material coating is limited to one of a Zinc-based material and an aluminum-based material. The corrosion resistant material defines a high temperature coating layer having a melting point greater than approximately 500° C.

In another aspect of the present disclosure, the zinc-based material defines one of a Zn-20Ni material and a Zn-10Ni-15Fe material and the aluminum-based material defines one of an Al-10Zn-10Mg material and an Al-20Si material.

In another aspect of the present disclosure, the substrate defines a Gen3 steel.

According to several aspects, a method for application of a high temperature coating to mitigate liquid metal embrittlement (LME) cracking includes: applying a corrosion resistant material coating onto a substrate material; identifying three factors occurring in unison when a liquid metal embrittlement (LME) cracking event is found, the LME cracking event occurring when a first factor defining a liquid metal phase of the corrosion resistant material coating applied to the substrate material is present simultaneously with a second factor defining an occurrence of a predetermined tensile strain in the substrate material and a third factor defining a predetermined microstructure sensitive to LME cracking; and modifying the first factor by selecting the corrosion resistant material as a high temperature coating layer having a melting point greater than approximately 500° C. to mitigate occurrence of the LME cracking event in the substrate material.

In another aspect of the present disclosure, the method includes applying the high temperature coating layer to the substrate using an electro-plating process.

In another aspect of the present disclosure, the method includes applying the high temperature coating layer to the substrate using a hot dip galvanizing process.

In another aspect of the present disclosure, the method includes selecting the corrosion resistant material from a range of zinc-nickel alloys for the high temperature coating layer which have melting points greater than approximately 500° C. and extending up to a melting point of approximately 1034° C.

In another aspect of the present disclosure, the method includes selecting the corrosion resistant material as a zinc-based material defining one of a Zn-20Ni material and a Zn-10Ni-15Fe material.

In another aspect of the present disclosure, the method includes selecting the corrosion resistant material as an aluminum-based material defining one of an Al-10Zn-10Mg material and an Al-20Si material.

In another aspect of the present disclosure, the method includes selecting a steel material for the substrate including a Gen3 steel as the material of the substrate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a front perspective view of an exemplary coated component made using the system and method of FIG. 1;

FIG. 3 is a diagrammatic flow chart identifying hot-dip galvanizing method steps for producing a coated component using the system and method of FIG. 1;

DETAILED DESCRIPTION

The following description is merely exemplary in nature and is not intended to limit the present disclosure, application, or uses.

Figure 1:
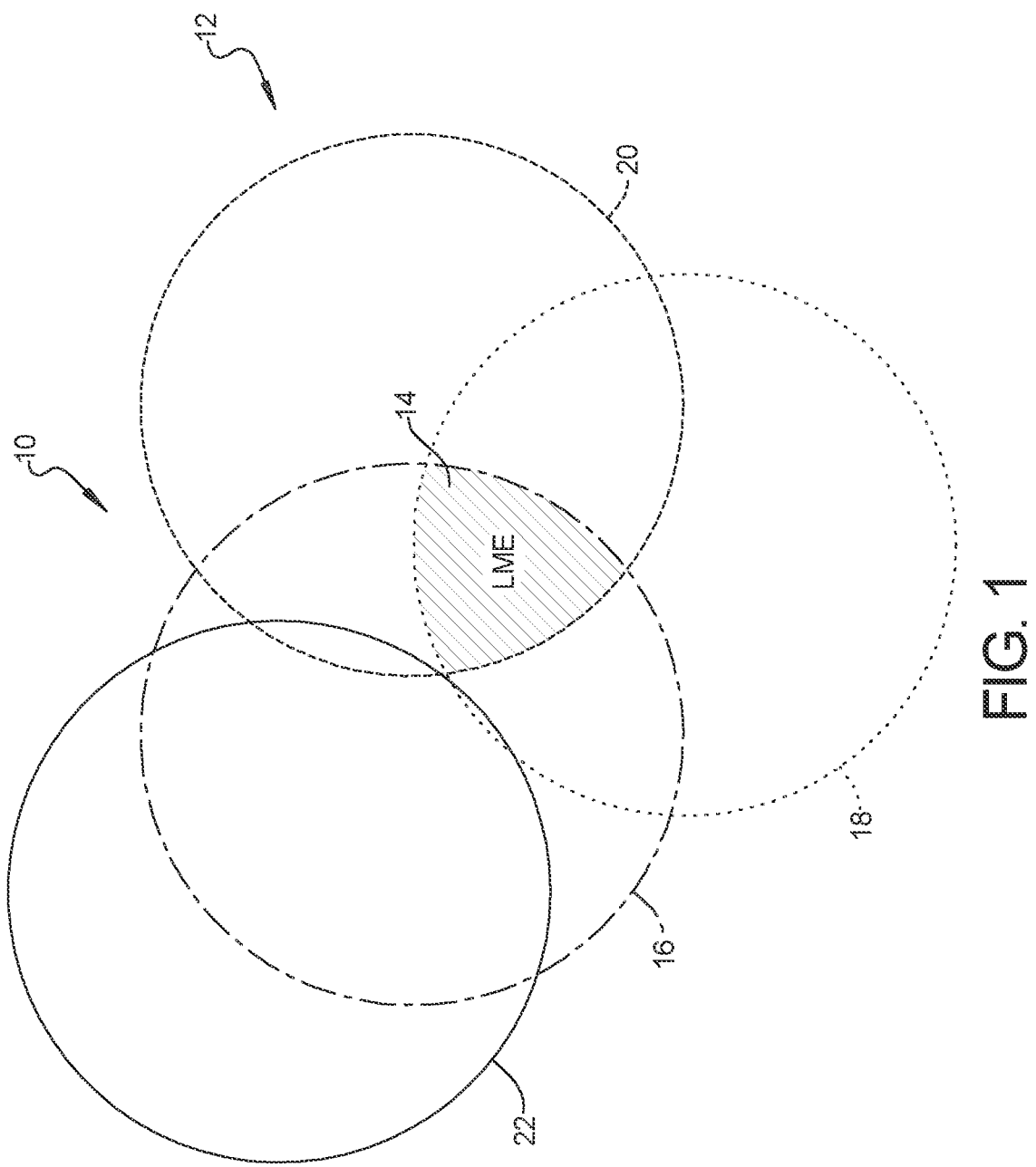
FIG. 1 is a venn diagram identifying a modified liquid metal phase which precludes an LME cracking event for the system and method according to an exemplary aspect.

Referring to FIG. 1, a system and method for application of a high temperature coating to mitigate liquid metal embrittlement (LME) cracking 10 of the present disclosure is presented using a venn diagram 12. The venn diagram 12 presents three factors that are known to occur in unison when an LME cracking event 14 is found, for example in steel substrate materials coated with a corrosion resistant material. The LME cracking event 14 may occur if a liquid metal phase 16 of a corrosion resistant material coating applied to a substrate material such as a Gen3 steel is present simultaneously with an occurrence of a predetermined tensile strain 18 in the substrate material together with a predetermined microstructure 20 which is sensitive to LME cracking. According to several aspects, the system and method for application of a high temperature coating discussed in reference to FIG. 2 to mitigate liquid metal embrittlement (LME) cracking 10 shifts the impact of the liquid metal phase 16 to a modified liquid metal phase 22 which precludes the LME cracking event 14.

The LME cracking event 14 may occur for example if a steel substrate such as a Gen3 steel is coated with a low temperature zinc material, defined herein as having a melting point at or below approximately 491° C. Pure zinc has a melting point of approximately 419° C., which is increased with the addition of nickel material to achieve the low temperature melting point at or below approximately 491° C. The predetermined tensile strain 18 may then be reached in the low temperature coated steel such as during cooling shrinkage of the two materials following coating. The predetermined tensile strain 18 may also be reached during application of a strain during subsequent welding of the low temperature melting point metal such as when a resistance welding process is used to couple coated steel components. If the low temperature coating material is replaced by a "high temperature" coating material of the present disclosure defined herein as having a melting point at or above approximately 500° C., the resulting modified liquid metal phase 22 precludes the LME cracking event 14.

Referring to FIG. 2 and again to FIG. 1, an exemplary coated component 24 made using the system and method for application of a high temperature coating to mitigate liquid metal embrittlement (LME) cracking 10 of the present disclosure includes a substrate 26 which may be a steel such as a Gen3 steel. Gen3 steels achieve the strength and ductility of Gen2 steels without the cost and joining problems associated with Gen2 steels. Gen2 steels are created using twinning-induced plasticity (TWIP) steels and austenitic stainless steels with the addition of alloying elements. Gen3 steels combine high elongation with high tensile strength and have a minimum tensile strength and elongation product of 20 GPa percent and are therefore desirable for use in automobile vehicles for its increased strength and its weight reduction.

A corrosion resistant material coating defining a high temperature coating layer 28 is applied to the substrate 26 using for example an electro-plating process or a hot dip galvanizing process. A coating thickness 30 of the high temperature coating layer 28 may range between approximately 5 microns to approximately 50 microns. According to several aspects the high temperature coating layer 28 may include one of multiple high temperature materials 32 individually having a melting point at or above approximately 500° C. The high temperature materials 32 may include but are not limited to one of a Zn-20Ni, a Zn-10Ni-15Fe, an Al-10Zn-10Mg and an Al-20Si material.

According to several aspects a chromate passivate layer 34 may also be applied over the high temperature coating layer 28. A topcoat 36 is then commonly applied onto the chromate passivate layer 34. The coated component 24 may then be joined to similar coated components or to other metal components for example by a resistance welding process. With continuing reference to FIGS. 1 and 2 the melting point temperature of the modified liquid metal phase 22 allowed by the high temperature coating layer 28 prevents the tensile strain 18 generated by the resistance welding process combined with the predetermined microstructure 20 from generating the LME cracking event 14.

Referring to FIG. 3 and again to FIGS. 1 and 2, a diagrammatic flow chart 38 identifies exemplary method steps for the system and method for application of the high temperature coating to mitigate liquid metal embrittlement (LME) cracking 10 to use hot dip galvanizing to apply the high temperature coating layer 28 to the substrate 26. In a caustic cleaning step 40 a formed member 42 of a steel material is dipped into a caustic bath 44. In a following rinsing step 46 the formed member 42 is then dipped in a rinsing bath 48 to remove remaining elements of the caustic bath 44. In a pickling step 50 the formed member 42 is then dipped into a pickling bath 52. In a subsequent second rinsing step 54 the formed member 42 is dipped in a second rinsing bath 56 to remove excess pickling chemicals. In a flux step 58 the formed member 42 is dipped into a flux bath 60. Following the flux bath 60, in a galvanizing step 62 the formed member 42 is immersed into a heated bath of a selected one of the high temperature materials 32 heated to a liquid state, which adheres to the formed member 42 and creates a coated galvanized member 64. Following the galvanizing step 62 one or more of the galvanized members 64 are allowed to cool and in an inspection step 66 are inspected to ensure successful formation of the high temperature coating layer 28.

According to several aspects, the high temperature coating layer 28 may be applied using an electro-plating process. During the electro-plating process a metal coating of the high temperature coating layer 28 material is tippled onto the substrate 26 through a reduction of cations of the substrate 26 using a direct electric current. The substrate 26 acts as the cathode (negative electrode) of an electrolytic cell. The electrolyte may be a solution of a salt of the high temperature coating layer 28 and the anode (positive electrode) may be a block of the high temperature coating layer 28 material. The current inducing the electrolytic process is provided by an external power supply.

Figure 4:
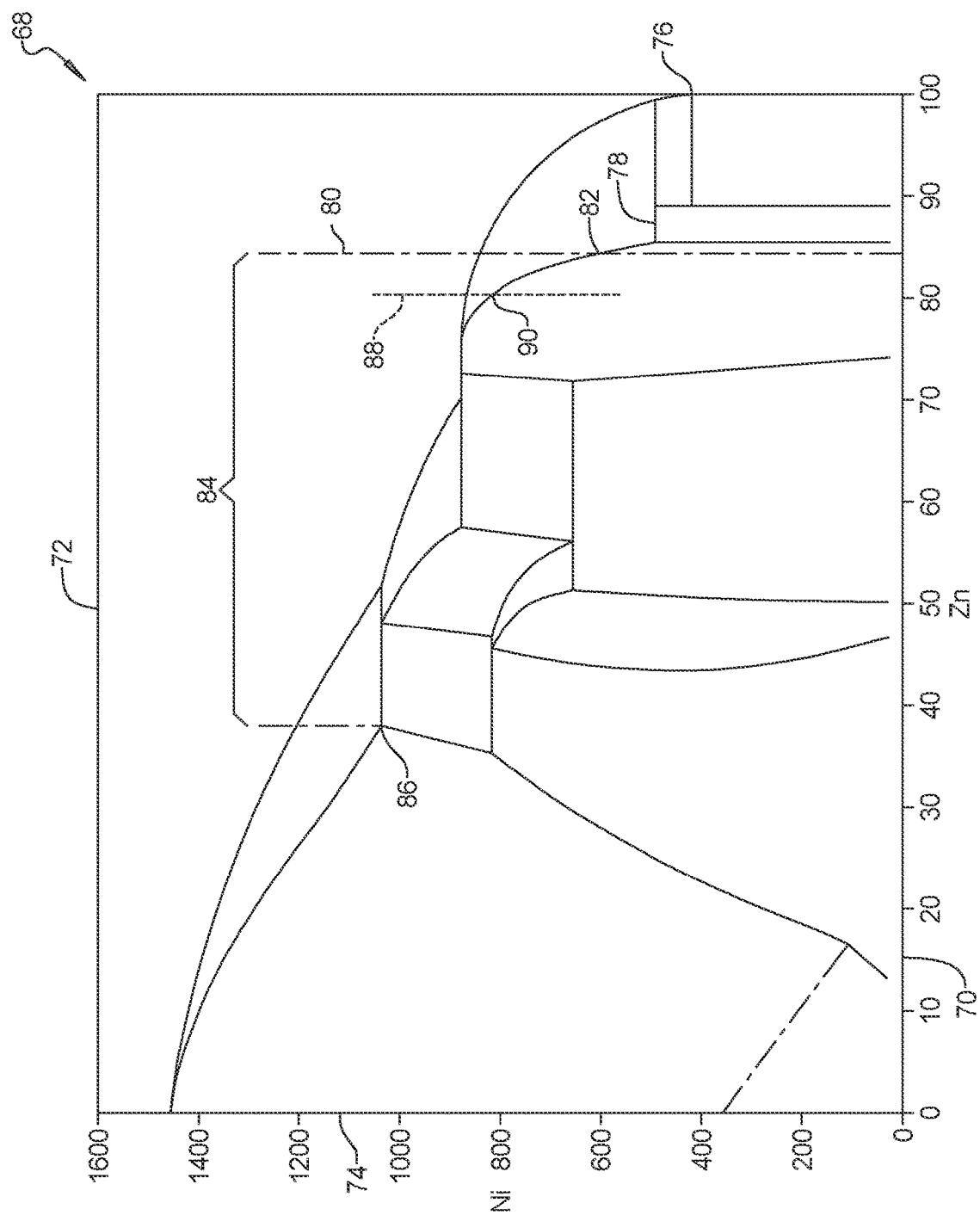
FIG. 4 is a zinc-nickel phase diagram used to select a zinc-nickel material for application as the high temperature coating layer using the system and method of FIG. 1.

Referring to FIG. 4 and again to FIGS. 2 and 3, a zinc-nickel phase diagram 68 may be used to select a zinc-based material for application as the high temperature coating layer 28. The phase diagram 68 allows comparison of an atomic percent zinc 70 and a weight percent zinc over a range of temperatures 74 in degrees C. A first curve 76 identifies a melting point of approximately 419° C. of pure zinc. Known coating materials containing a portion of nickel and zinc are bounded between the first curve 76 and a second curve 78 for zinc-nickel materials having a melting point of approximately 491° C. These known material combinations have been found to be susceptible to LME cracking. It has therefore been identified that a solution to mitigate LME cracking is to formulate the high temperature coating layer 28 from material identified on the phase diagram 68 greater than a zinc-nickel alloy intersection 80 having a melting point 82 of at least 500° C. A range 84 of zinc-nickel alloys may be selected for the high temperature coating layer 28 which have melting points extending from approximately 500° C. up to a melting point 86 of approximately 1034° C. One of the zinc-nickel materials acceptable for the high temperature coating layer 28, Zn-20Ni identified herein, is presented by an intersection line 88 indicating Zn-20Ni is within the range 84 and has a melting point 90 greater than 850° C.

Figure 5:
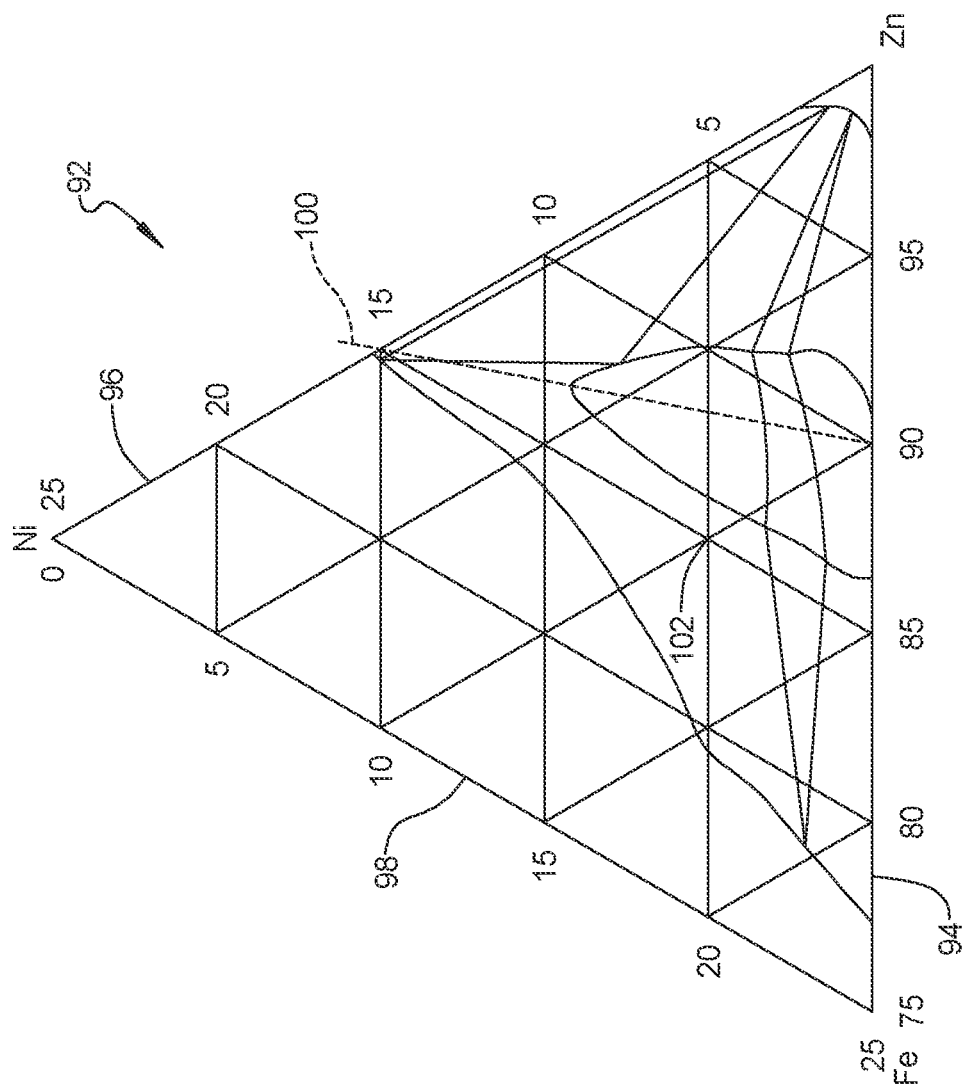
FIG. 5 is a zinc-nickel-iron ternary phase diagram used to select a zinc-nickel-iron material for application as the high temperature coating layer using the system and method of FIG. 1.

Referring to FIG. 5 and again to FIGS. 1 through 4, an isothermal section at 560° C. of a ternary zinc-nickel-iron phase diagram 92 may be used to select a zinc-based material for application as the high temperature coating layer 28. The phase diagram 92 provides a zinc range 94 defining atomic percent zinc, a nickel range 96 defining atomic percent nickel and an iron range 98 defining atomic percent iron. A temperature axis 100 differentiates material combinations having a melting point greater or less than approximately 500° C. A Zn-10Ni-15Fe material 102 is satisfactory for the high temperature coating layer 28 as its melting point is greater than 500° C.

Figure 6:
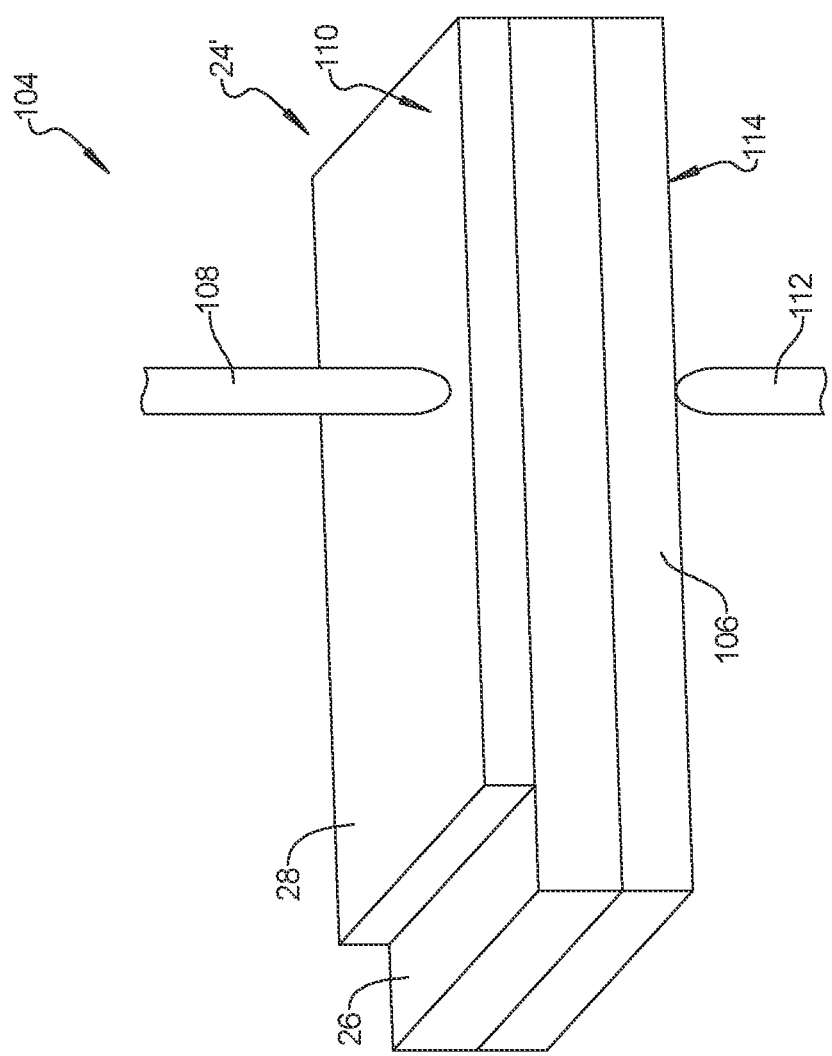
FIG. 6 is a front perspective view of the exemplary coated component of FIG. 2 connected by resistance welding to a metal plate.

Referring to FIG. 6 and again to FIGS. 1 and 2, during a resistance welding process a welded component 104 may be created by resistance spot welding the coated component 24' (having the chromate passivate layer 34 and the topcoat 36 removed for clarity) to a metal plate 106 such as a steel plate. A first electrode 108 contacts a surface 110 of the coated component 24' and a second electrode 112 contacts a surface 114 of the metal plate 106. The high temperature melting point at or above 500° C. of the high temperature coating layer 28 minimizes an amount of either zinc or aluminum that melts around a periphery of and underneath the first electrode 108, thereby mitigating LME embrittlement cracking in the substrate 26.

A system and method for application of a high temperature coating to mitigate liquid metal embrittlement (LME) cracking of the present disclosure offers several advantages. These include a system and method to apply high temperature coatings (Zn-based and Al-based) which reduce coating layer melting for example during resistance welding of galvanized advanced high strength steels. Reducing coating layer melting consequently reduces liquid metal embrittlement cracking of a base material. Exemplary high temperature coating materials include Zn-20Ni, Zn-10Ni-15Fe, Al-10Zn-10Mg, Al-20Si. These high temperature coating materials increase a coating melting point to 500° C. or greater, thereby avoiding coating material melting during post-coating material cooling and during resistance spot welding.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for application of a high temperature coating to mitigate liquid metal embrittlement (LME) cracking in automobile vehicles, comprising:
   applying a corrosion resistant material coating onto a substrate;
   identifying three factors occurring in unison when a liquid metal embrittlement (LME) cracking event is found, the LME cracking event occurring when a first factor defining a liquid metal phase of the corrosion resistant material coating applied to the substrate is present simultaneously with a second factor defining an occurrence of a threshold tensile strain in the substrate and a third factor defining a threshold microstructure sensitive to LME cracking; and
   modifying the first factor by selecting the corrosion resistant material as an Al-10Zn-10Mg material having a melting point greater than approximately 500° C. to mitigate occurrence of the LME cracking event in the substrate.

2. The method of claim 1, including applying the corrosion resistant material to the substrate using an electroplating process.

3. The method of claim 1, including applying the corrosion resistant material to the substrate using a hot dip galvanizing process.

4. The method of claim 1, including selecting a Gen3 steel as a material of the substrate.

5. The method of claim 1, wherein the corrosion resistant material coating has a coating thickness between 5 microns to 50 microns.

6. The method of claim 1, further comprising applying a chromate passivate layer over the corrosion resistant material coating.

7. The method of claim 6, further comprising applying a topcoat onto the chromate passivate layer.

8. The method of claim 6, further comprising prior to applying the corrosion resistant coating:
   dipping the substrate into a caustic bath;
   rinsing the substrate in a rinsing bath to remove remaining elements of the caustic bath;
   pickling the substrate in a pickling bath;

rinsing the substrate in a second rinsing bath to remove excess pickling chemicals;
dipping the substrate into a flux bath; and
galvanizing the substrate by immersing the substrate into a heated bath of the corrosion resistant coating heated to a liquid state in order to apply the corrosion resistant coating onto the substrate.

* * * * *